May 12, 1959    E. L. BARRETT    2,886,620
METHOD AND APPARATUS FOR MAKING POSITIVE BATTERY PLATES
Filed July 12, 1954    2 Sheets-Sheet 1
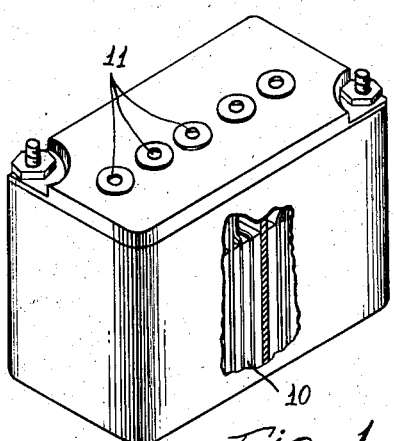
Fig. 1.
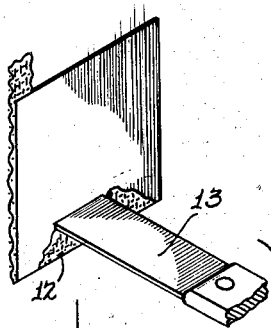
Step 1. Coat With Silver Oxide (Ag$_2$O) Paste
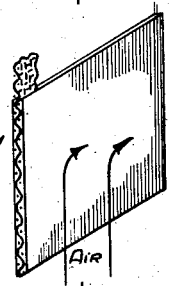
Step 2. Partially Dry
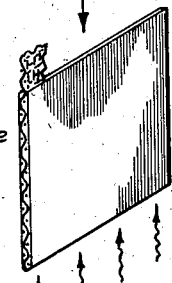
Step 3. Sinter To Convert Oxide To Spongey Silver
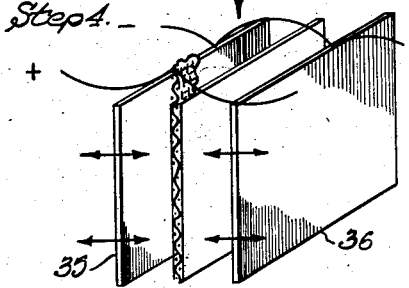
Step 4. Electrolyze In KOH With Vibration Agitation Of Electrolyte to Form Ag$_2$O$_2$
Fig. 2.
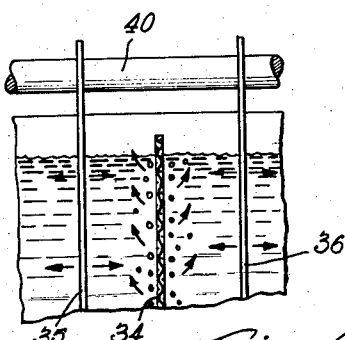
Fig. 6.
Inventor
Edward L. Barrett
Carlson, Pitzner, Hubbard + Wolfe
Atty's

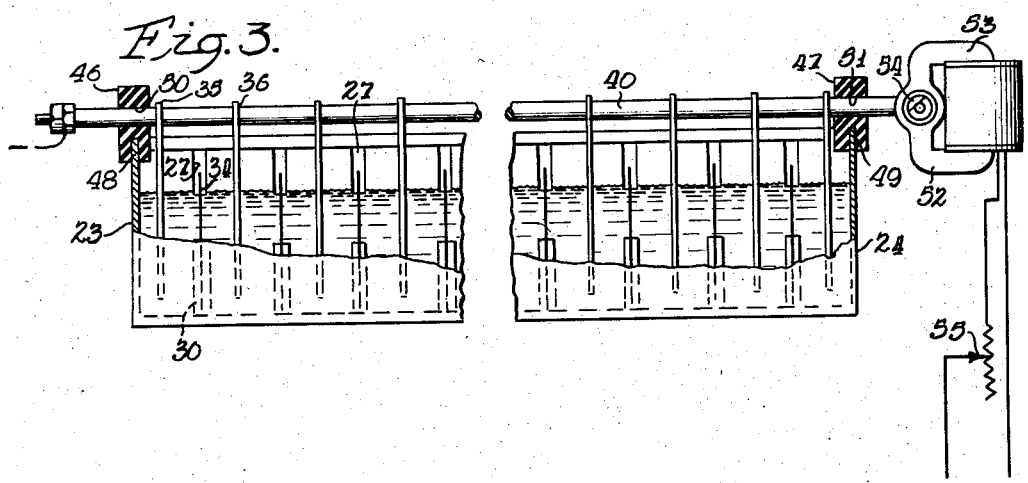
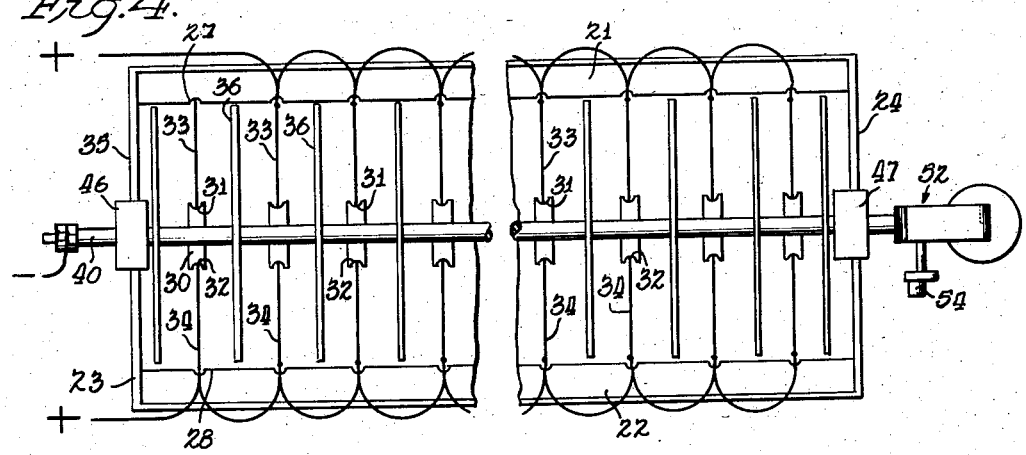
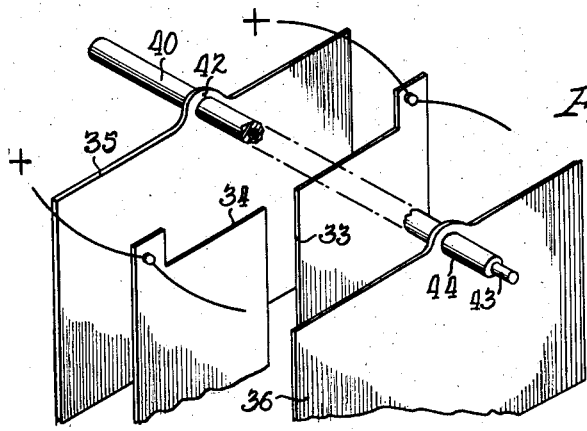

United States Patent Office 2,886,620
Patented May 12, 1959

2,886,620

METHOD AND APPARATUS FOR MAKING POSITIVE BATTERY PLATES

Edward L. Barrett, La Grange, Ill.

Application July 12, 1954, Serial No. 442,696

5 Claims. (Cl. 136—34)

The present invention relates to battery plates, and more particularly to a procedure for producing a positive plate for use in batteries of the silver-zinc-alkali type.

It is an object of the present invention to provide an improved method of preparing positive plates, resulting in plates which are more uniform than prior plates in their physical and chemical characteristics and which enable production of high output batteries which are consistent and reliable in operation. It is another object to provide an improved procedure for preparing positive plates which enables high quality plates to be produced much more quickly than before. It is a related object to provide an improved method which enables the current density during the charging operation to be increased beyond that which can normally be tolerated, but without any tendency of the plates to throw off particles of active material. It is still another object, related to the foregoing, to provide a method of producing a positive plate which results in a more even distribution of current between parallel-connected plates, enabling the plates to keep in step with one another during the electrolyzing process. Finally, it is an object to provide a novel device for carrying out the improved method.

Other objects and advantages of the invention will become apparent upon reading the attached detailed description and upon reference to the drawings, in which:

Figure 1 shows in perspective a battery of the type to which the present invention is applicable, with a portion of the case broken away to show the internal construction.

Fig. 2 is a flow diagram setting forth the steps which are preferably employed in producing a positive battery plate.

Fig. 3 is an elevation in partial section showing apparatus employed in carrying out the present invention.

Fig. 4 is a plan view of the device shown in Fig. 2.

Fig. 5 is a fragmentary perspective showing a pair of vibrated electrodes with battery plates arranged side by side between them.

Fig. 6 is a fragmentary elevation showing the dissipation of hydrogen gas during the electrolyzing process.

While the invention has been described herein in connection with a preferred embodiment of the method and a preferred embodiment of the device for carrying out the method, it will be understood by one skilled in this art that the invention is not necessarily limited thereto, but would include various modifications and alternatives, the invention being limited only by the spirit and scope of the claims appended hereto.

The silver-zinc-alkali type of battery has characteristics which make it suitable for use in specialized applications such as guided missiles, where large amounts of power are required for short spaces of time, power on the order of 250 watts for a period of several minutes, and with the battery limited to a volume of less than 10 cubic inches. The battery to be described below should have absolute reliability and a high degree of consistency between production units. The improved procedure which I employ for making the positive plates has been found to be an important factor in establishing such characteristics. A typical battery consisting of five cells is shown in Fig. 1. Each of the cells has a bundle 10 of positive and negative plates, for example, five positive and six negative, separated by suitable porous separators. The positive plates, with which this invention is concerned, have bi-valent silver oxide as the active material, while the negative plates are formed of spongy zinc. The battery is stored in the dry condition and just before use electrolyte is added through an opening 11 at the top of each of the cells. The amount of electrolyte is purposely quite limited, most of it being absorbed by the porous separators so that each cell contains a relatively small amount of free electrolyte.

In Fig. 2 the steps which I employ in producing a positive plate are graphically illustrated in the form of a flow diagram. The first step consists in applying a paste of silver oxide, $Ag_2O$, to a metal grid 12 measuring approximately 2 inches by 2 inches. Preferably the grid is formed of silver screen or mesh, and the paste is applied to both sides by a spatula 13, as shown. Silver is preferred, since it is so closely related to the active plate material, bi-valent silver oxide, which is formed in the final or electrolyzing step. In mixing the paste, silver oxide powder of high purity is used, mixed with water which has been distilled and de-ionized. The consistency of the paste is relatively unimportant and is a matter which may be left to the discretion of the operator. The paste should be applied in an even coat, filling all of the interstices except for the connecting tab, with the high points of the wire mesh serving as a convenient guide for the applied edge of the spatula.

Following the coating operation, the plates are allowed to "dry" in contact with moving air and at room temperature, for a period of several minutes, in order to remove the excess moisture in the paste. The plates are not dried completely in this step, but sufficient moisture is removed so as to prevent violent or excessive steaming when the plate is subjected to an elevated temperature in the following step. It is found that where this partial drying step is omitted, the escaping steam tends to form minute fissures and craters in the coating which impair the operating characteristics of the final plate.

In step 3 of my procedure the plates are sintered by placing them in an oven at 400° C., which converts the paste to spongy silver. The plates are left in the oven for approximately 10 minutes, or until it is noted that a white and adherent layer of pure, spongy silver has been formed. A reducing atmosphere may be used to facilitate conversion but it has not been found necessary in practice to take any special steps in this regard.

Following this, the plate is electrolyzed, i.e. subjected to electrolytic oxidation in a solution of five percent potassium hydroxide, using inert negative electrodes, and with the electrolyte subjected to vibration generally perpendicular to the positive plates. In practice the invention, the vibrated area of the electrolyte should extend over the entire presented area of the plates being electrolyzed. In the preferred procedure waves of vibration in the electrolyte should be applied to both sides of the plate simultaneously and from sources that are out of phase relative to the surfaces of the positive plate being acted upon.

The frequency of the vibration, as well as the amplitude, should be sufficiently high so as to effectively and immediately dislodge bubbles forming on the surface of the positive plate during electrolyzing. In practice, I have employed a frequency of approximately 100 to approximately 500 vibrations per second and with a total excursion at the source of the vibration of approximately 0.020 inch. There is no definite upper limit to the amplitude of the vibration, since the amplitude which may be used depends to some degree upon the frequency. It is obviously possible to increase the amplitude to a point which will produce frothing and spillage of the electrolyte and possibly damage to the positive plates. Where the frequency is kept relatively low, for example, on the order of 100 vibrations per second, I propose that the maximum excursion be not higher than, say, 0.100 inch. In practice, I prefer to keep the amplitude sufficiently low so as to be barely evident on the surface of the electrolyte adjacent the positive plate. An excursion of 0.020 of an inch has been successfully employed in production runs with a frequency of 400–500 vibrations per second.

While the vibration may be set up in the electrolyte by any desired means to obtain prompt and efficient removal of the bubbles and the production of more consistent and reliable positive plates, I prefer to set up such vibration by vibrating the negative plates which are arranged opposite the positive plates and spaced therefrom, vibrating all of the negative plates simultaneously during the entire course of the electrolyzing procedure. This is accomplished employing the setup shown in Figs. 3 and 4 and as further detailed in Figs. 5 and 6.

Referring to Figs. 3 and 4, an electrolyzing tank is indicated at 20 having side walls 21, 22 and end walls 23, 24. Means are provided within the tank 20 for supporting a series of positive plates which have been coated with silver oxide and sintered as described above. The supporting means includes a series of notches 27, 28 formed in the inside walls of the tank 20. Vertically arranged within the tank and in alinement with the notches 27, 28 are supporting posts 30 having registering notches 31, 32. The tank is preferably of such width as to receive pasted positive plates within the notches 27, 31 and 28, 32, respectively. The first two positive plates 33, 34 will be taken as representative.

Arranged on the opposite sides of the positive plates 33, 34 and spaced therefrom are inert negative plates 35, 36. The latter plates are preferably about twice the size of the positive plates and "cover" substantially the entire area of the latter. The negative plates are preferably formed of metal which is relatively inert in the solution of electrolyte. For this purpose I prefer to use stainless steel, with the plates spaced approximately ¼ inch from the positive plates. In a production setup I have used 14 negative plates to electrolyze 26 positive plates, although it will be apparent that more plates may be used in a single tank.

In carrying out the present invention, the negative plates are mounted on a common longitudinal support which is axially vibrated so as to set up vibrations in the electrolyte which are applied simultaneously over the entire area of the positive plates and in a direction at right angles to the positive plates. In the present device the longitudinal support is in the form of a rod 40 which rigidly engages the top edges of all of the negative plates. If desired, the positive plates may be provided with upstanding tabs 42 which are appropriately punched to receive a cylindrical rod 43 and with the negative plates being separated by suitable spacers 44 (see Fig. 5). To floatingly support the longitudinal member on the tank 20, mounts 46, 47 made of rubber or similar resilient material are employed. These mounts are preferably notched, as indicated at 48, 49, and are slipped over the upstanding end walls 23, 24 of the tank. The supporting member 40 may be secured to the resilient mounts 46, 47 by providing the mounts with openings 50, 51, in which the supporting member 40 is inserted, as shown in Fig. 3. Such resilient support enables the negative plates to be symmetrically positioned relative to the positive plates, yet permits all of the negative plates to be vibrated in unison. The plates may be of 20 gauge stock and thus relatively rigid.

For the purpose of vibrating the member 40 a vibrator 52 is attached to one end. Such vibrator should be capable of adjustment, both with respect to the frequency of vibration and the amount of excursion. These requirements are met by providing a small induction-type motor 53 having an eccentric weight 54 mounted on its shaft. It will be apparent to one skilled in the art that the excursion may be controlled by varying the amount and eccentricity of the weight 54, while the frequency may be adjusted by varying the applied voltage, for example, by a rheostat 55.

During the electrolyzing process the vibrator 52 may be adjusted to produce a total excursion of the negative plates of approximately 0.020 inch at a frequency of 400 to 500 vibrations per second. The positive plates, being anchored in the walls of the tank 20, are maintained stationary. Since all of the negative plates are vibrated in unison, it will be apparent that waves of vibration will be set up in the electrolyte for application simultaneously over the entire area of the positive plates and with the waves applied to the opposite sides of the positive plates being out of phase with respect to one another.

The advantages of the present method and apparatus will be apparent upon comparing the result with that previously obtained in the absence of vibration. Observations on a conventional electrolyzing arrangement showed that certain of the plates produced gas bubbles immediately, indicative of current flow, while others produced little or no gas bubbles until after the electrolyzing process had been under way several hours. Furthermore, it was noted that the gas bubbles tended to form on the plates in irregular patches. The resulting positive plates had an uneven appearance, the surface of the plates apparently indicating that the electrolyzing process had been carried to a higher degree on some of the plates and on some areas of the plates than on others. This unevenness was attributed to variations in electrical resistance in the various parallel branches of the electrolyzing circuit and to the insulating or "barrier" effect of the collected gas bubbles.

When the plates are vibrated in accordance with the present invention, a rather striking difference is noted. In the first place, all of the positive plates begin gassing, i.e., producing bubbles, promptly as the electrolyzing current is turned on. Furthermore, it is found that the bubbles are jarred loose and escape to the surface practically as fast as they are formed. The tendency of bubbles to collect at localized areas on the plate is entirely eliminated. After electrolyzing is complete, and upon conversion of all of the silver to bi-valent silver oxide, the plates are removed from the electrolyzing tank and dried. In appearance they are much more uniform than the plates previously obtained, indicating that conversion to bi-valent silver oxide has occurred evenly and thoroughly throughout the area of the plate.

The time required for electrolyzing may be substantially reduced as a result of the vibrating step. It has been common practice in this field to electrolyze the plates for periods of more than twenty hours at currents of about 150 milliamperes per positive plate. Such long periods have been considered necessary in order to be sure that all of the spongy silver is converted to the bi-valent oxide form. Because of the fact that each of the plates, using the present procedure, begins to electrolyze immediately and in step with all of the other plates, and for a number of other reasons which are peculiar to the present procedure and which have not as yet been fully investigated, heavier electrolyzing currents may be employed and the electrolyzing time may be substantially reduced. The reduction in time is particularly striking where the electrolyzing current is applied beginning with a low conventional value, and gradually increasing in magnitude to a half ampere or more as the electrolyzing progresses. In practical production the time may be substantially halved and satisfactory positive plates have been reduced in certain instances less than three hours.

It has further been found that where the above procedure is employed, the plate remains intact and substantially no particles of active material are to be found in the form of a deposit or sludge at the bottom of the electrolyzing tank at the end of the run.

Batteries constructed using plates as formed above have been found to have uniform characteristics resulting in high output and a high degree of reliability, making the batteries particularly advantageous for use in guided missiles or the like.

What I claim is:

1. The method of producing a battery plate having a bi-valent oxide of a noble metal as the active material which includes electrolytically oxidizing a base of porous spongy noble metal by supporting the base in a stationary position while setting up vibrations in the electrolyte over substantially the entire plate area which have a frequency and amplitude sufficient to dislodge the bubbles of gas formed thereon.

2. A device for electrolytically oxidizing positive battery plates which comprises an electrolyte tank, means for supporting a series of positive plates therein parallel to and spaced from one another, a series of interleaved negative plates dimensioned to cover the entire area of said positive plates, a longitudinal support for engaging each of said negative plates along its upper edge so that all of said negative plates form a rigid unit with said support, and means at the end of the support for longitudinally vibrating the same to set up vibrations in the electrolyte at right angles to the surfaces of said positive plates.

3. A device for electrolytically oxidizing battery plates which comprises an electrolyte tank, means for supporting a series of active plates therein parallel to and spaced from one another, a series of chemically inert plates for interleaving with said active plates and dimensioned to cover the entire area of said active plates, a longitudinal support for engaging each of said inert plates along its upper edge so that all of said inert plates form a rigid unit relative to said support, and means for longitudinally vibrating the support to set up vibrations in the electrolyte at right angles to the surfaces of said active plates.

4. A device for electrolytically oxidizing battery plates which comprises an electrolyte tank, means for supporting a series of active plates therein parallel to and spaced from one another, a series of chemically inert plates spaced for interleaving with said active plates and dimensioned to cover the entire area of said active plates, a longitudinal support for engaging each of said inert plates along its upper edge so that all of said inert plates form a rigid unit with said support, means for longitudinally vibrating the support to set up vibrations in the electrolyte at right angles to the surfaces of said positive plates, and means for resiliently mounting the support on said tank for relative vibrating movement.

5. The method of producing a battery plate having divalent silver oxide as the active metal comprising the steps of coating an electrically conductive metal grid with silver oxide in the form of a paste, drying the plate and paste in a current of air, heating the plate in an oven until the paste is converted to spongy silver, electrolytically oxidizing the plate with the plate being the positive electrode, and, while electrolytically oxidizing setting up vibrations in the electrolyte over substantially the entire plate area while maintaining the plate stationary.

References Cited in the file of this patent

UNITED STATES PATENTS

| | | |
|---|---|---|
| 874,374 | Muller et al. | Dec. 17, 1907 |
| 948,056 | King | Feb. 10, 1910 |
| 2,177,877 | Pfaffmann | Oct. 31, 1939 |
| 2,700,693 | Fischbach | Jan. 25, 1955 |
| 2,721,834 | Koury | Oct. 25, 1955 |
| 2,744,860 | Rines | May 8, 1956 |
| 2,746,732 | Guillette | May 22, 1956 |

FOREIGN PATENTS

| | | |
|---|---|---|
| 557,386 | Great Britain | Nov. 18, 1943 |